Sept. 6, 1938.　　　F. H. DALRYMPLE　　　2,129,407
CHAIN AND METHOD OF MAKING THE SAME
Filed Feb. 1, 1938　　　4 Sheets-Sheet 1
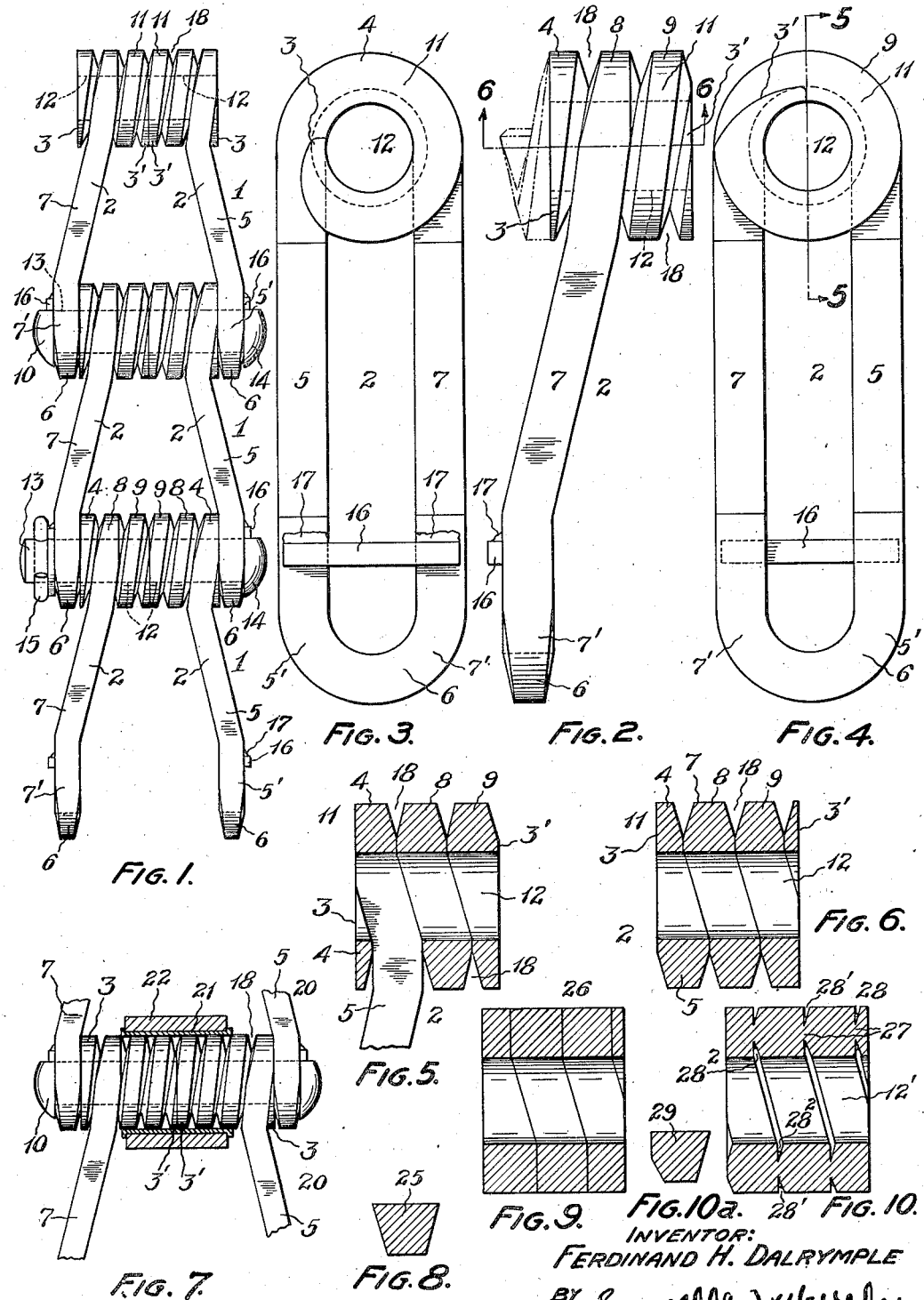
INVENTOR:
FERDINAND H. DALRYMPLE
BY Saywell and Wessler
ATTORNEYS

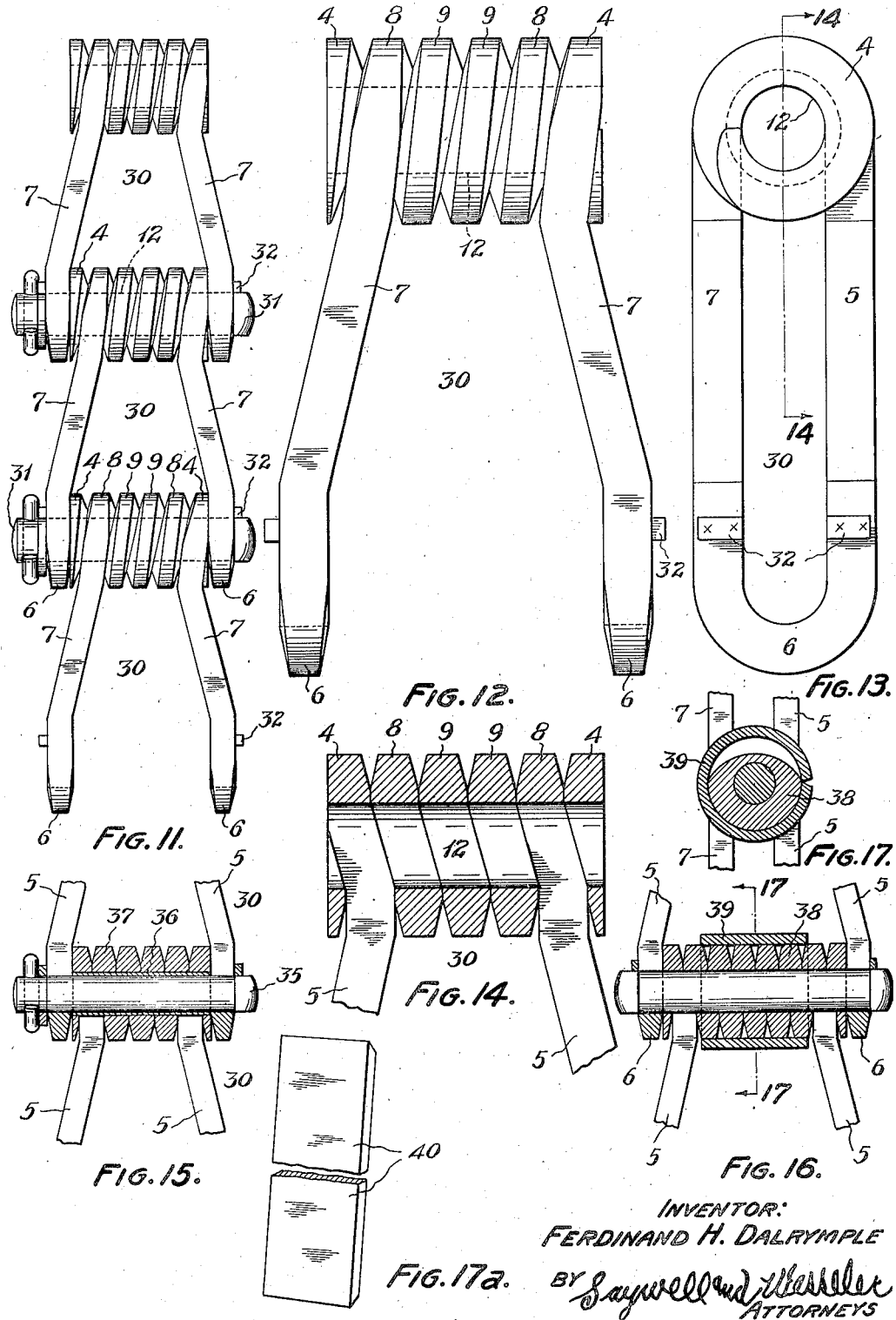

Sept. 6, 1938.   F. H. DALRYMPLE   2,129,407
CHAIN AND METHOD OF MAKING THE SAME
Filed Feb. 1, 1938   4 Sheets-Sheet 3

INVENTOR:
FERDINAND H. DALRYMPLE
BY Saywell and Wesseler
ATTORNEYS

Sept. 6, 1938.   F. H. DALRYMPLE   2,129,407
CHAIN AND METHOD OF MAKING THE SAME
Filed Feb. 1, 1938   4 Sheets-Sheet 4
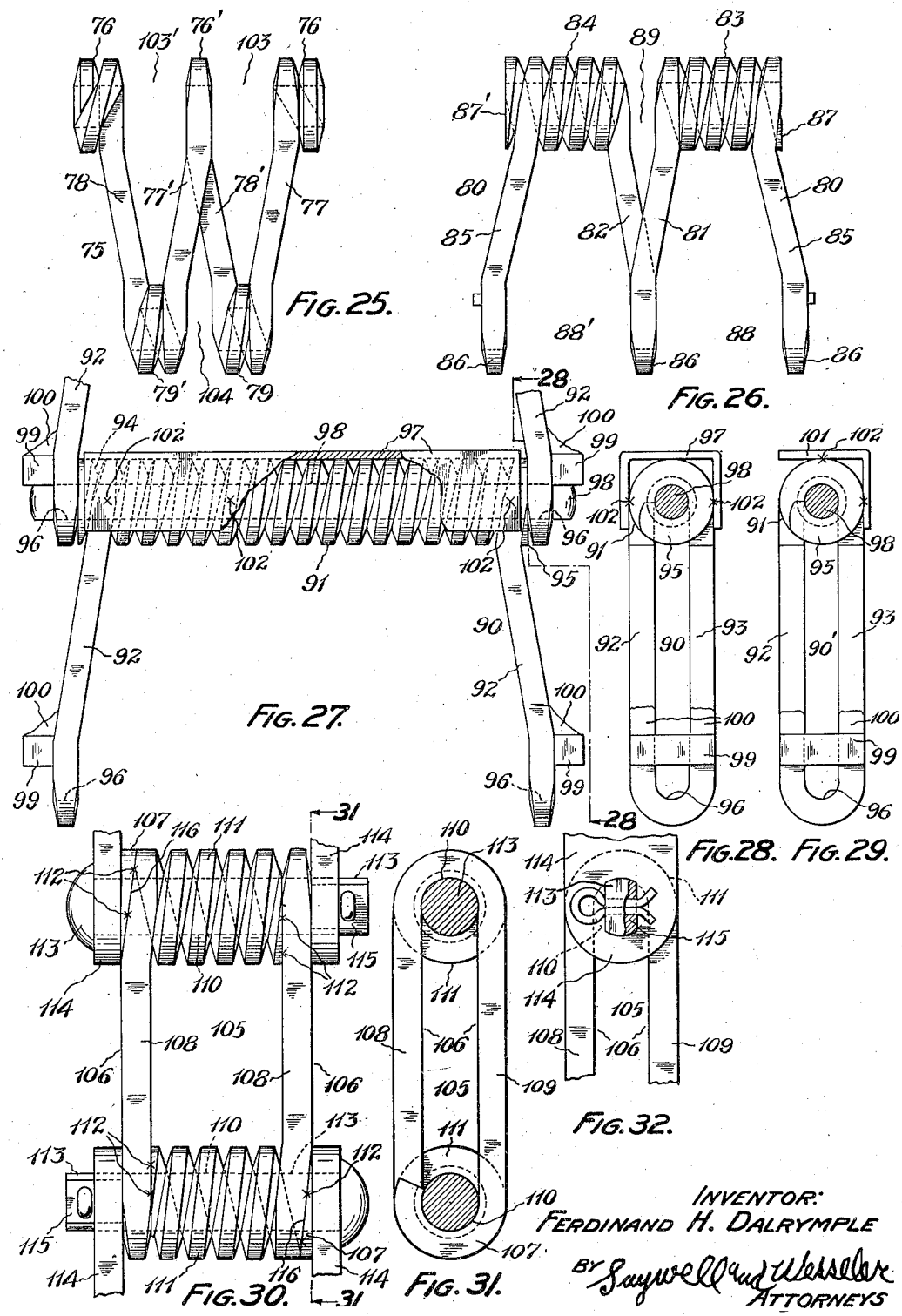
INVENTOR:
FERDINAND H. DALRYMPLE
BY Saywell and Wesseler
ATTORNEYS Patented Sept. 6, 1938

2,129,407

UNITED STATES PATENT OFFICE 2,129,407

CHAIN AND METHOD OF MAKING THE SAME

Ferdinand H. Dalrymple, Bedford, Ohio

Application February 1, 1938, Serial No. 188,107

31 Claims. (Cl. 59—8)

The invention particularly relates to chains comprised of pin-connected links having pin-barrels and side bars, the improvements further consisting in making links and elements thereof by certain coiling and bending of stock of suitable cross-section and length to form the links or certain elements thereof as unitary structures. The invention in its several aspects presents advantages over cast and stamped chains and other built-up structures comprised of separately made barrels and side bars. These advantages will be hereinafter severally mentioned.

The improved chain elements, of the general character hereinbefore mentioned, and the improved processes of making the same, are adaptable to the structure and formation of various types of chain, and suitable for carrying the various types of attachments which such chains customarily carry for various functions, and there are hereinafter described, for illustrative purposes, by reference to certain figures of the accompanying drawings, a few types of chains and the structures thereof and methods of forming the same, according to my invention; as also, are described and shown certain illustrative types of attachments.

The annexed drawings and the following description set forth in detail certain means in which the chain improvements are embodied, and certain steps by which the improved processes of making chain may be worked, the disclosure comprising only a few of the many forms of chain in which the principle of the invention may be embodied and only a few of the various series of steps by which the improved processes may be worked.

In said annexed drawings:

Figure 1 is a top plan of several connected links of one form of sprocket chain embodying the principle of the invention, this particular structure being one in which the link is formed from two identical half-links each comprising a unitary structure consisting of a side bar of U-formation and one-half the link barrel, the two half-links being assembled in laterally reversed relation to form the complete link;

Figure 2 is a top plan of the left-hand half-link of one of the complete links shown in Figure 1, upon an enlarged scale;

Figure 3 is a left-hand side elevation of the structure shown in Figure 2;

Figure 4 is a right-hand side elevation of the structure shown in Figure 2;

Figure 5 is a fragmentary horizontal axial section, taken in the plane indicated by the line 5—5, Figure 4;

Figure 6 is a vertical axial section, taken in the plane indicated by the 6—6, Figure 2;

Figure 18:
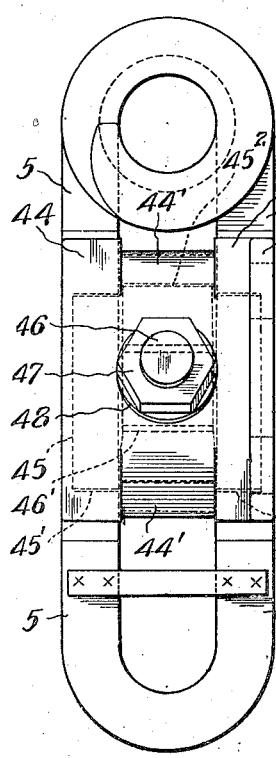
Figure 19:
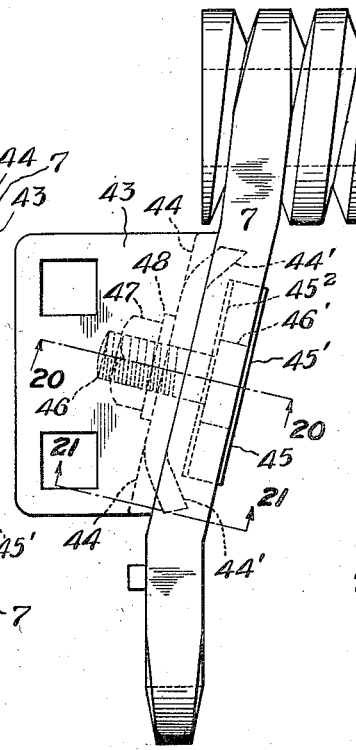
Figure 20:
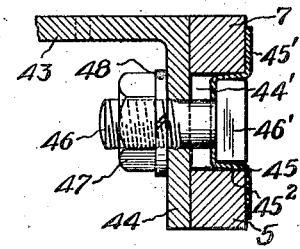
Figure 21:
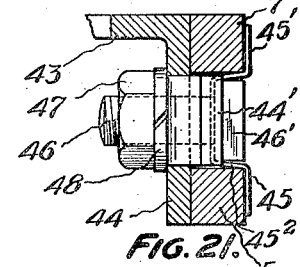
Figure 22:
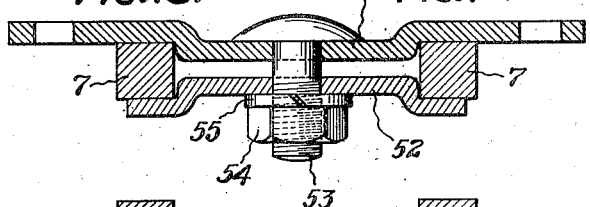
Figure 23:
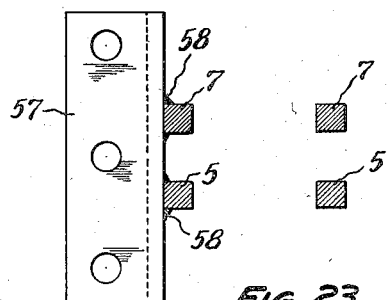
Figure 24:
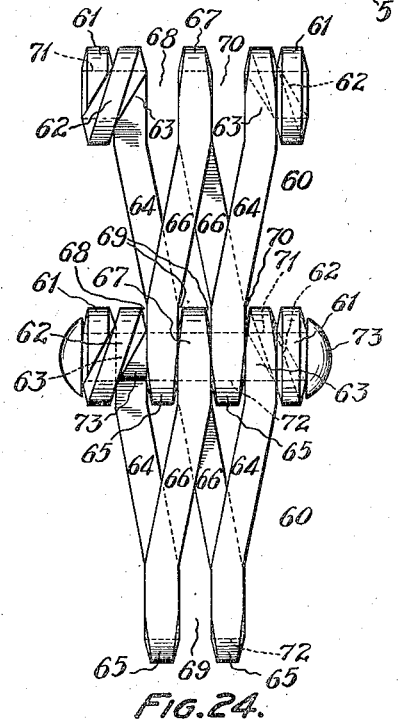

Figure 7 is a fragmentary top plan view of the elements of a modified form of sprocket chain, assembled with a pin connecting two adjacent links thereof, which chain is comprised of links similarly formed and assembled to those shown in Figure 1, except that the coiling of the link stock is somewhat more extensive than that shown in Figure 1 to form a barrel of greater length and, except, further, that the assembly indicated in Figure 7 is provided with rollers, one of which with an interior bushing therefor is shown in section;

Figure 8 is a cross-section of chain stock suitable for coiling to form a type of pin-barrel which is illustrated in axial section in Figure 9;

Figure 10 is an axial section of another barrel type formed by coiling stock such as shown in cross-section in Figure 10ª;

Figure 11 is a top plan of a few assembled links of a sprocket chain, embodying the princple of the invention, similar to the showing in Figure 1, the chain shown in Figure 11, however, being formed of complete links and not of combined half-links such as shown in Figure 1;

Figure 12 is a top plan of one of the links shown in Figure 11, upon an enlarged scale;

Figure 13 is a right-hand side elevation of the structure shown in Figure 12;

Figure 14 is a fragmentary horizontal axial section, taken in the plane indicated by the line 14—14, Figure 13;

Figure 15 is a fragmentary horizontal section of a sprocket chain assembly, such as shown in Figure 11, assembled with a pin connecting two adjacent links thereof, but in Figure 15 a bushing is provided interiorly of the barrel, the coiling having been so effected as to produce a barrel of suitable interior diameter to accommodate the bushing;

Figure 16 is a horizontal section, similar to that shown in Figure 15, except that an exterior bushing is shown instead of an interior bushing, and except further that the coiling has been extended to form a barrel of greater length;

Figure 17 is a vertical section, taken in the plane indicated by the line 17—17, Figure 16;

Figure 17ª is a perspective view of stock suitable for forming the exterior bushing shown in Figures 16 and 17;

Figure 18 is a left-hand side elevation of a half-link, similar to that shown in Figure 3, to which is secured a certain type of side attachment;

Figure 19 is a top plan of the structure shown in Figure 18;

Figures 20 and 21 are fragmentary vertical sections, taken, respectively, in the planes indicated by the lines 20—20 and 21—21, Figure 19;

Figure 22 is a vertical section through the side bars of a chain-link embodying the invention and upon the upper members of which bars is mounted another form of attachment;

Figure 23 is a vertical section through the side bars of a chain-link embodying the invention, to one side bar of which is welded a third type of attachment;

Figure 24 is a top plan of two connected links formed from stock so bent and coiled as to form pin-barrels or bearings at both ends of each link, the coils or bends upon each link end being spaced so as to receive between them the coils or bends of the opposed end of the adjacent link to form the complete pin-barrel or bearing, the whole forming a substitute leaf or balance chain structure or a lace chain;

Figure 25 is a top plan of another form of link for making lace chain and embodying the principle of the invention;

Figure 26 is a top plan of a link of a double-width sprocket chain in which is embodied the principle of the invention;

Figure 27 is a fragmentary broken top plan of a drag chain embodying the principle of the invention, assembled with a pin connecting two adjacent links;

Figure 28 is a vertical section, taken in the planes indicated by the line 28—28, Figure 27;

Figure 29 is a section similar to Figure 28, but showing a modified type of drag chain;

Figure 30 is a top plan of a chain having a straight side bar and embodying the principle of the invention;

Figure 31 is a vertical section, taken in the plane indicated by the line 31—31, Figure 30; and Figure 32 is a fragmentary right-hand elevation of the structure shown in Figure 30, partially in vertical section.

Referring to the annexted drawings in which the same parts are indicated by the same respective numbers in the several views, and first referring particularly to Figures 1–6, by the improved process a full link 1 of a sprocket chain is made from suitable stock of the desirable cross-section through forming by coiling, in manners hereinafter fully described by illustrative methods of so doing, two identical half-links 2, of which one is shown in Figures 2–4, three connected complete links 1 each formed by combining a pair of the identical half-links 2 being shown in Figure 1. The stock is fed from reels or coils, and by fully automatic machines is cut into suitable lengths and wound into the half-links 2 each comprised of a pin-barrel section 11 and a side bar 5—6—7 of U-formation, of which the U-bend portion 6 forms a pin support. The two ends 3 and 3' of the stock-length, upon opposite sides thereof, are formed tapered in the cutting, in planes transverse to the axis of winding, as illustrated in Figures 3 and 4. In Figure 2 is illustrated how, if desired, after the coiling, the end 3 of the barrel may be ground, the original coiled stock eliminated by the grinding being indicated in broken lines.

In order to make a complete link 1, one of the half-links 2, Figure 2, is turned one hundred eighty degrees, i. e., laterally reversed, and then brought into assembled condition with another half-link 2, with the respective barrel portions 11 in coaxial relation, and so as to bring the coiled ends 3' of the two stock lengths into engagement. Then the half-links 2 are connected together and the link assembled with an adjacent link by a pin 13 passed through the bore 12 and pin supports 6 and secured by detachable cotter 15, or the pin 13 may be upset to form a riveted connection 10, both types of connection being shown in Figure 1. In order to keep the pin 13 from turning, the ends of the pin are formed with flat side portions which lie flush with cross bars 16 secured at their ends by fillet welds 17 to the exterior faces of the upper and lower side members 5 and 7 of the side bars. The cross bars 16 also act as strengthening members and reinforce the open side bars 5—6—7 from deflecting under severe shock impact, or when the working load exceeds the chain's normal factor of safety and approaches the elastic limit of the chain.

For purposes of illustration, there will now be described some of the many methods for forming a half-link 2, Figure 2, from suitable stock. Assuming that the desired resultant half-coil 2 shall have one barrel end face such as illustrated in Figure 3, and its other barrel end face such as shown in Figure 4, the stock is coiled at both ends so as to form at the end 3 about one and one-half coils 4 of helical formation and at the end 3' about two coils 8 and 9 of helical formation and of the same internal diameter as the coils 4, these coils being formed by winding the stock at its respective two ends upon opposite sides of the stock body. Then the stock is bent substantially into doubled formation, or an elongated U-formation, in an area midway between the two coiled ends and so as to form a substantially semi-circular mid-turn 6, which shall serve as a pin support, thus also forming the two members 5 and 7 of a side bar, of which member 5 will be considered the lower member, and member 7 the upper member, it being assumed that the showing of the chain in Figure 1 is a top plan section of the chain utilized for a horizontal run. Then the two coiled ends of the doubled stock are forced together so as to form therefrom a pin-barrel section 11 having the bore 12 formed by coaxial coils 4, 8, and 9 formed at the two ends of the stock. The side bar comprised of the members 5, 6, and 7 is then coined or otherwise formed into the desired formation, an offset formation thereof being shown in Figure 2, the outer ends 5' and 7' of the members 5 and 7 forming the turn 6 being straightened or made perpendicular to an axis parallel to the axis of the barrel 11 so as smoothly to receive the barrel of an adjacent chain link between their inner faces and the opposed inner faces of the upper and lower members 5 and 7 of an opposed side arm of a complementary half-link 2. Then, if desired, the end face of the barrel 11 formed by the stock end 3 is ground, as shown in Figure 2.

Such other operations as are desirable may be effected upon the half-link 2, such as heat-treating, case-hardening, welding, reaming or any desired machining.

The general plane of the side bar structure of my improved half-link 2 is perpendicular to the axis of the coaxial barrel coils but, of course, when the side bar members are coined into offset formation, such as shown in Figure 2, parts of the side bar structure lie outside of its general plane or diverge somewhat from said plane.

Inasmuch as the longitudinal side bar 5—6—7 of each chain element is of U-formation, with a pair of such side bars opposed one to the other in a complete link, the arms 5 and 7 of each bar are superimposed, when the link is used as shown in Figure 1, so that the arms 5 and 7 of any one side bar are intersected by a common plane which transversely intersects the axis of the pin-barrel. Also, when the stock is bent into a U-formation, and the two ends of the stock are wound into barrel sections, these barrel sections relatively recede from each other as they are wound, i. e., the winding of the barrel sections is in opposite directions from the open end of the U-shaped formation. The open end of the U-formation merges into the wound barrel section.

Another method of winding the stock to form the half-link 2, Figure 2, consists in first bending the stock into doubled formation, or elongated U-formation, and then coiling the two ends of the stock away from each other so as to form the respective coils 4, and the coils 8 and 9. Possibly this method of forming the half-link 2 is preferable, inasmuch as the manipulation of the stock probably would be more conveniently effected. Another method of winding would consist in first coiling one end of the stock, and then effecting the intermediate bending of the stock into the elongated U-formation, and then coiling the other end of the stock.

Preferably, the coiling is effected under initial tension so that for many uses the securing together of the two half-links 2 by a pin 13 will be all the connection that is necessary. However, resistance welding may be utilized to secure the adjacent coils 4, 8, and 9 of a half-link 2 together, and to secure the two half-links 2 together, and such welding is described with reference to Figures 10 and 10a, together with a suitable chain stock section to obviate any disadvantages arising from the flash. It is assumed in Figures 1–6 that the stock utilized is of uniform width, and thus the difference between the outer and inner diameters of the barrel 11 formed by coiling the stock, plus the effects of drawing the outer surface of the stock and compressing the inner surface thereof in coiling, produce resultant wedge-shaped exterior recesses 18 between adjacent coils of the barrel 11.

The number of coils inside the barrel ends of the side bars, illustrated by the coils 8 and 9, may be any desired number suitable for the desired chain. Also, the coiling may be such as to produce the desired diameter of barrel bore. The beveling at the end 3' of the stock may be varied so as to produce of the two opposed coiled beveled ends 3', when two half-links 2 are joined together, a middle coil of the complete link of any desired thickness. If the coiling between the barrel ends of the opposed side arms consists of an even number of identical coils, it is evident that the ends 3' of the stock length need not be beveled at all, for the purpose of matching the half-coils 2, since each half-coil would have an integral number of complete coils. I have shown in Figure 1 a beveling of the end 3' of the stock which will produce a mid-coil equal in thickness to the other coils, when two half-links 2 are assembled together with the coiled ends 3' flush. In other words, in the form of link 1 shown, the beveled ends 3' of the two lengths of stock which form the complete link 1 are complementary.

The form of chain shown in Figure 7 is similar to that shown in Figure 1 except that the stock for each half-link is suitable for forming an additional coil, as clearly apears in Figure 7, and upon the pin-barrel of the complete link 20 formed by two such half-links is mounted a roller 22 provided with an interior bushing 21 fitted to the exterior surface of the pin-barrel.

I show in Figure 9 a section of pin-barrel 26 in which the side faces of adjacent coils are in engagement throughout their entire depth. This is accomplished by providing stock 25, Figure 8, suitably tapered so as to compensate for the lesser internal diameter of the pin-barrel 26 formed by coiling the stock 25 than the external diameter thereof.

In Figure 10, I show a pin-barrel 28 in which adjacent faces of the coils are spaced both at the top and the bottom, see 28' and 28². This is effected by using stock 29 of suitable cross-section such as illustrated in Figure 10a. The purpose of providing the spacing 28² between the inner ends of adjacent coil faces is that, since the adjacent coils of the half-links are secured together by welding, such as indicated by the resistance welds 27, the flash may be accommodated and thus obviate the finishing of the bore 12' that might be otherwise necessary.

Figures 11–14 illustrate an improved link 30 formed by my improved processes of making chain in which the entire link is formed of one piece. The coiling is similar to that directed with reference to the link shown in Figure 1 except that only one length of stock is utilized, which is substantially twice as long, for a link of the same character, the entire link 30 being formed of the one length.

In order to illustrate the method of forming the one-piece link 30 shown in Figures 11–14, it is stated that the mid-portion of suitable stock is coiled to form a helix comprised of such a number of coils as is desired for the pin-barrel portion between the barrel ends of the side bars of the completed link 30, and then each extending portion of the stock is bent into a U-formation to form a pin support and a side bar, leaving at the extreme end of each stock portion enough stock from which to subsequently wind the respective coils desired at the two ends to complete the link barrel.

The link 30 shown in Figures 11–14 may be formed in other ways than that just described, for instance, the stock may first be bent so as to form the opposed U-shaped side bars, and then wound to form a central helix, after which the extreme end portions of the stock can be wound to complete the pin-barrel. Another method of winding would consist in first forming the opposed U-shaped side bars, and then winding the two ends of the stock to form the pin-barrel terminals, and then winding the central helix to complete the pin-barrel. Other variations in the sequence of winding and bending will be evident.

In the form of chain shown in Figure 11, I have illustrated pin connections of the type in which the pin 31 can be reversed to compensate for wear, the pin 31 being provided with opposed flat faces adapted to lie flush with lugs 32 which are spot-welded to the side bars, thus to prevent the pin 31 from turning.

In Figure 15 I illustrate a pin connection between adjacent links of the type shown in Figures 11–14 except that an internal bushing 36 has been forced into the pin-barrel 37 before the pin 35 and the side bars of the adjacent link have been applied, the coiling of the pin-barrel 37 having been effected in such a manner as to provide a sufficient inside diameter of the pin barrel 37 to accommodate the bushing 36.

In the form of pin-barrel 38 shown in Figures 16 and 17, two extra turns have been made in the coiling, and bushing stock 40 of the design illustrated in Figure 17a has been wound around the pin-barrel 38 so as to form an exterior bushing 39.

In Figures 18–21 I illustrate a type of attachment 43 secured at one side of a chain formed from links similar to those shown in Figure 1. The attachment 43 is of angular formation and one leg 44 thereof is secured to the link 1 with its exterior face flush with the top and bottom members 5 and 7 of a side bar upon one side of the link. The angle attachment leg 44 is formed with parallel cuts adjacent opposed sides so that the attachment portions 44' between these cuts may be bent in between the opposed faces of the upper and lower side members 5 and 7, as clearly shown in Figure 19. The attachment leg 44, between the bent portions 44', is formed with a hole adapted to receive a bolt 46 passing through, and secured by its head 46' in, a central channel portion 45² of a bracket 45 having a spring flange 45' lying flush with the inner faces of the members 5 and 7. The channel portion 45² is disposed between the members 5 and 7. The assembly is secured by a nut 47 engaging the bolt 46 against a lock washer 48 abutting the outer face of the attachment leg 44, thus causing the spring bracket 45 to pull the bolt 46 toward the right, Figure 20. Therefore, the spring bracket 45 serves as a take-up in the event of any loosening between the nut 47, washer 48, attachment leg 44 and the outer faces of the members 5 and 7.

In Figure 22 is illustrated a form of attachment 51 designed to be mounted upon the top faces of the two upper members 7 of the improved link. The attachment 51 is held by a bolt 53 whose head abuts the upper face of the attachment, this bolt 53 passing through a hole formed in a strap 52 whose ends engage the under faces of the upper members 7. A nut 54 engages the depending stem of the bolt 53, an interposed lock washer 55 being provided.

In Figure 23, I illustrate the mounting of an attachment 57 upon the lower and upper members 5 and 7 upon one side of a link, the securing of the attachment 57 to the members 5 and 7 being effected by means of fillet welds 58.

In Figure 24, I illustrate how a substitute leaf or balance or lace chain can embody the improvements. An entire lace link 60 can be formed by the following illustrative coiling method. Starting with stock of desired cross-section and length, a substantially complete turn 67 midway of the ends of the stock is made by coiling the stock circularly or cylindrically, i. e., in planes square with or perpendicular to the axis of the proposed barrel, then the ends of the two portions of the stock upon the two sides of the turn 67 are coiled into a half turn 63 of circular formation and a half turn 62 of helical formation terminating in a substantially complete circular turn 61, the bores of the turns 63—62 and 61 having the same diameter as the bore of the turn 67. Then the two portions of the stock upon the two sides of the turn 67 are bent into substantially complete circular turns 65 midway of their ends, the two turns 65 having bores of the same diameter as the turns 63—62 and 61, thus forming two side bars comprised each of an inset arm 64 and an offset arm 66. This method of coiling forms pin-barrels 71 and 72 at both ends of the link suitable for accommodating connecting pins 73. The mid-turn 67 at one end of the link is spaced from the adjacent circular turns 63 a distance substantially equal to the width of the circular turns 65 at the other end of the link, as indicated by the numbers "68" and "70", and said circular turns 65 are spaced apart a distance substantially equal to the width of the mid-turn 67, as indicated by the number "69", and all as clearly shown in Figure 24. Thus, two links 60 can be assembled since the spaces 68 and 70 between the two turns 63 and the mid-turn 67 provide accommodation for the two turns 65 of a link adjacent one end of the link, and the space 69 between the two turns 65 provides accommodation for the turn 67 of a link adjacent the other end of the link.

Other methods of bending and coiling the stock length so as to form the balance chain link 60, Figure 24, consists in first coiling the stock so as to form the turns 65, then forming the turn 67, after which the respective ends of the stock length can be coiled. Another method of bending and coiling would consists in first forming the end barrel coils 63—62—61, then forming the mid-turn 67, and then bending the two halves of the stock length to form the barrel 72 and the side bars 64—66. Other variations in the sequence of bending and coiling so as to form the link 60 will be evident.

There are many combinations of the width of link, length of barrel sections, character of barrel sections, amount of space between adjacent barrel sections, number of barrel sections and intermediate spaces, shapes of connecting bars, manners of interlacing, etc., which can be utilized to produce various forms of substitute leaf or balance or lace chain embodying my improvements. In Figure 25, I show a link 75 of a lace chain, of modified construction which embodies the principle of my invention, and which comprises wound end barrel sections 76 to the ends of which are respectively connected one end of a top bar 77 and one end of a bottom bar 78, to the other ends of which bars 77 and 78 are connected wound barrel sections 79 and 79'. Intermediate the wound barrel sections 79 and 79' is a U-shaped connecting bar comprised of an upper member 77' and a lower member 78' having a U-bend 76' forming a pin support. The barrel sections 76 and the support 76' are coaxial, and the barrel sections 79 and 79' are coaxial. The spaces 103 and 103' between the pin support 76' and the barrel sections 76 serve to accommodate the barrel sections 79 and 79' of an adjacent link at one end of the link 75 and the space 104 between the barrel sections 79 and 79' serves to accommodate the pin support portion 76' of an adjacent link at the other end of the link 75.

In Figure 26, I show a form of double-link 80 for sprocket chain, which embodies the principle of my invention. In other words, the link 80 is a structure similar to link 30, Figure 11, except that it is substantially twice the width, and is provided with an intermediate U-shaped connecting bar. This multiple link 80 is integrally formed by various sequences of operation, of which an illustrative one consists in bending the stock to make an intermediate connecting bar of U-formation having the upper member 81 and the lower member 82, and the U-bend 86 forming a support for a connecting pin. Then the free ends of the members 81 and 82 are coiled from opposite sides to form respective barrel sections 83 and 84 beyond which the two stock ends are bent into connecting bars of U-formation, of which the upper members 85 are shown, thus forming additional U-bend connecting-pin supports 86, after which the extreme terminal end portions of the stock are coiled into end barrel sections 87 and 87', respectively. Such coiling of the connecting bars is effected as to bring the supports 86 into coaxial alignment whereby a long pin may secure the link 80 at one end to an adjacent link having its members 81—83—85—87 and 82—84—85—87' positioned in the spaces 88 and 88', respectively, and the bores of whose barrel sections 83—84—87—87' also receive and accommodate the connecting pin, the link 80 being connected at its other end by a pin to an adjacent link whose intermediate connecting bar 81—82 has its U-bend 86 disposed in the space 89.

Other desirable sequences of operations to form the double-link 80 will readily suggest themselves, such as first forming the barrel sections 83 and 84, then bending the stock to form the intermediate connecting bar consisting of the members 81 and 82, and then forming the outside U-shaped connecting bars of which the members 85 are shown, and finally forming the end barrel sections 87 and 87'.

In Figures 27 and 28, I illustrate the application of the principle of my invention to a drag chain. A drag chain link 90 is formed from stock coiled into an intermediate elongated helically-wound barrel section 91 whose end portion adjacent one end of the barrel 91 is bent into a U-formation forming a connecting bar having the upper member 92 and the lower member 93, thus providing also a support 96 for a connecting pin, the extreme terminal portion of this stock end being coiled into a barrel section 94 coaxial with the barrel section 91. The stock extending from the other end of the barrel 91 is correspondingly bent and coiled to form a connecting bar 92—93 and a terminal barrel section 95 also coaxial with the barrel section 91. Enclosing the front end of the barrel 91 and welded thereto by resistance welds 102 is a channel 97 adaptable for pushing material and sliding upon the trough through which the material is conveyed, and serving other functions well-known to those skilled in the art. Secured to the exterior faces of the connecting bar members 92 and 93 as by fillet welds 100 are wearing and strengthening lugs 99, the same being disposed adjacent the supports 96 of the connecting bars so as substantially to register with the web of the channel 97 upon the adjacent link, when two links are assembled, the function of these wearing lugs 99 also being well-known to those skilled in the art. The connecting together of adjacent links 90 is effected by an elongated pin 98.

As is well-known to those skilled in the art, in some forms of drag chains, angles efficiently serve for the pushing and sliding operations, so that in Figure 29 I show a drag chain link 90' embodying the principle of my invention and provided with an angle 101.

The principle of my invention is well adapted to the formation of a chain having straight side bars. As is well-known to those skilled in the art, such a chain comprises center links having barrels at each end connected by side bars, combined with alternating outer side bars, the center and outer links being connected together by pins upon which the center links are journalled, but which pins are fixed to the outer bars. One form of such chain embodying the principle of my invention is shown in Figures 30, 31 and 32. This form of such chain is made by forming two chain elements 106 consisting of an outer coiled end barrel section 107, a connecting bar of U-formation and consisting of an upper member 108 and a lower member 109, and an inner coiled barrel section 111. By combining two chain elements 106 so formed, in the manner shown in Figure 30, i. e., reversing the elements end for end and side for side, thus bringing the outer barrel section 107 of one element 106 into coaxial alignment with the pin bearing 110 of the other element, and securing the free ends of the barrels 111 to the inside faces of the members 108 and 109 of the other element, as by resistance welds 112, and also welding together the barrel sections 107 and 111, an integrally-formed center link 105 is formed which can be connected to the inside faces and adjacent the ends of standard or special outer connecting bars, such as bars 114, by connecting pins 113 which have flat terminal portions 115 secured in the outer connecting bars 114.

The manner of forming and coiling each chain element 106 of the center link 105 corresponds to that hereinbefore described with reference to the forming of chain element 2, Figure 2, except that the members 108 and 109 of the side bars of the center link of the chain are preferably straight members rather than of offset formation, such as is shown with reference to the members 5 and 7 of the chain element 2 in Figure 2, and except further that the outer barrel section 107 and the inner barrel section 111 are so wound as to have their adjacent faces in close contact as illustrated by "116."

The improved chain shown and described has much to recommend it, including important advantages over other standard chains of equal weight, such as stamped and cast chains and other built-up chain structures. The improved chain is very adaptable for many uses in its most simple forms, such as shown in Figures 1 and 11, and also readily lends itself to such refinements as may be advantageous or suitable for special uses, amongst such refinements being the use of internal and external bushings of various types, and rollers of various types, and some of these refinements have been illustrated and described. The improved chain is an all-purpose chain and, although essentially a low cost chain, is adaptable for such purposes as a carrier or a transfer agent, or as a substitute for leaf or balance or lace chain. The improved chain combines with its lower cost a greater strength and less weight than present standard chains for equivalent duties. Its simplicity is marked, inasmuch as the riveted type in its most simple form consists of only two parts, i. e., the link and the pin. The economy of manufacture of the most simple form is an outstanding advantage. Its method of manufacture involves no waste or scrap and any desired cross-section of stock can be used. Any desired pitch or strength is easily obtained and every link is uniform. The improved chain is more flexible than present standard chains, and can withstand greater shock and impact. It can be exteriorly lubricated and the lubricant will seep through to the pin bearings. The improved chain lends itself to the dissipation of heat more readily than present standard chains, thus rendering it more adaptable for work in elevated temperatures. For many purposes, and in many forms, it involves no machine work in its manufacture except the making of the cotter pin hole in the detachable type. In such cases, all stamping, broaching, and reaming operations used in the manufacture of fabricated steel chain are eliminated. When extreme accuracy of pitch is required, it is obtained by a simple reaming operation. Also, there is eliminated the necessity of assembling pin-barrels and side bars by press fit or mechanical locks. Of course, the improved chain is readily subject to special treatments, where desired, such as heat-treatments, manufacture from alloy or annealed stock, provision of rust-protective coatings, mechanically-locked cotters, removable pins, reversible pins for restoring pitch and lengthening wear, and use of various attachments, some of which adaptations have been shown and described. The improved chain elements can be formed from either hot or cold stock. If desired, as illustrated in Figure 10, the two ends of the coiled stock from which the half-link is made can be welded together, preferably by resistance welding, whereby any unspiralling, unwinding or pulling out under severe shock loads is obviated, thus avoiding distortion or increase of the pitch. Further, if desired, the two half-links can be welded together to form a one-piece complete link. The welding together of the half-links can be effected after the assembly therewith of bushings and/or rollers. When the chain is used in its most simple form, or with external bushings, such as shown in Figure 16, the thickness of the pin-barrel or the external bushing provides a very ample sliding surface on a conveyor runway, and the sliding wear is divided between the pin-barrel and the lower portion of the open side bar. This sliding wear does not affect correct sprocket tooth engagement and, if the wear is excessive, the link can be reversed or turned upside down, thus presenting a new wearing or sliding surface. The spiral barrel provides a smooth uniform bearing for the connecting pin; as also, when rollers are used, a smooth uniform bearing for the internal face of the roller. In the detachable type of link, when pin locks are used of sufficient size, the vertical locks act as a partial shield for the cotters. Inasmuch as the pin-barrel is integral with the side bar, there is no possibility of the barrel and side bar becoming disengaged, as quite often happens on standard built-up chains. Furthermore, the continuous one-piece link has higher elastic limit with consequent greater toughness than stamped or cast links of equal weight. The barrel size is very liberal, which eliminates the possibility of crushing under severe loads. Oftentimes, the punching of bushing or pin holes in the side bars of standard built-up stamped chains produces microscopic fractures which are subject to amplification during heat treatment and still further amplification in service, so that the pin pulls through the hole of the side bar. This cause of trouble is eliminated in the improved one-piece construction. By reason of the method of manufacturing the improved link, there is only slight possibility of the chain being made under pitch or over pitch. As a result of this uniformity, every link or pitch makes sprocket tooth engagement, which is not true of many types of less accurate low cost chains.

What I claim is:

1. A method of integrally forming a chain element comprising a pin-barrel and a side bar consisting in bending stock into a U-shaped formation and coiling the two ends of the stock into barrel sections whose axes are substantially normal to the general plane of the side bar.

2. A method of integrally forming a chain element comprising a pin-barrel and a side bar consisting in bending stock into a U-shaped formation, coiling the two ends of the stock into barrel sections whose axes are substantially normal to the general plane of the side bar, and fixing the barrel sections in axial alignment.

3. A method of integrally forming a chain element comprising a pin-barrel and a side bar consisting in bending stock into a U-shaped formation and coiling the two ends of the stock under initial tension into relatively receding barrel sections.

4. A method of integrally forming a chain element comprising a pin-barrel and a side bar consisting in bending stock into a U-shaped formation and helically coiling the two ends of the stock into barrel sections whose axes are substantially normal to the general plane of the side bar.

5. A method of integrally forming a chain element comprising a pin-barrel and a side bar consisting in bending stock into a U-shaped formation, helically coiling the two ends of the stock into barrel sections and fixing the latter in axial alignment, and coining the structure between the barrel sections into a side bar of the desired formation.

6. A method of integrally forming a chain element comprising a pin-barrel and a side bar consisting in bending stock into a U-shaped formation, helically coiling the two ends of the stock into barrel sections and fixing the latter in axial alignment, and coining the structure between the barrel sections into an offset side bar.

7. A method of forming a chain link comprising a pin-barrel and connecting bars consisting in separately forming of stock a plurality of integral chain elements each consisting of a barrel portion and a side bar by bending the stock into U-shaped formations and coiling the stock into end barrel sections, then assembling the elements with all barrel sections in axial alignment and securing together the several elements.

8. A method of forming a chain link comprising a pin-barrel and opposed side bars consisting in separately forming of stock two integral chain elements each consisting of a barrel portion and a side bar by bending the stock into U-shaped formations and coiling the stock into end barrel sections, then assembling the elements with the barrel sections in axial alignment and securing together the two elements.

9. A method of integrally forming a chain link comprising a pin-barrel and opposed side bars consisting in helically coiling stock intermediate its ends into a barrel structure of desired length, then bending the two portions of stock between the barrel structure and the respective stock ends each into a U-shaped formation, then coiling the two ends of the U-shaped formations into barrel end structures, and then fixing the three barrel structures in axial alignment.

10. A method of forming a lace chain link consisting in coiling spaced coaxial pin-barrel structures from and intermediate the ends of stock, bending the respective stock portions between barrel structures each into a U-shaped formation having a U-bend pin bearing and bending and coiling the respective stock portions between the outer barrel structures and the stock ends each into a U-shaped formation having a U-bend pin bearing and a coiled-end barrel structure, said U-bend pin bearings being made coaxial and each adjacent two being spaced apart a distance substantially equal to the length of one of said intermediate barrel structures, and then bringing the intermediate barrel structures and the end barrel structures into axial alignment with the intermediate barrel structures spaced apart a distance substantially equal to the length of a U-bend pin bearing.

11. A method of forming a lace chain link consisting in coiling a pin-barrel structure from and intermediate the ends of stock, bending and coiling the respective stock portions between the barrel structure and the stock ends each into a U-shaped formation having a U-bend pin bearing and a coiled-end barrel structure, said U-bend pin bearings being made coaxial and being spaced apart a distance substantially equal to the length of the intermediate barrel structure, and then bringing the said intermediate barrel structure and the end barrel structures into axial alignment with the intermediate barrel structure spaced from each of said end barrel structures a distance substantially equal to the length of a U-bend pin bearing.

12. An integrally-formed chain element comprising a pin-barrel and a side bar of U-formation, said barrel including coaxial wound sections disposed upon opposite sides of both arms of the side bar.

13. An integrally-formed chain element comprising a pin-barrel and a side bar of U-formation, the U-bend of the side bar being formed into a connecting-pin support, said barrel including coaxial wound sections disposed upon opposite sides of both arms of the side bar.

14. An integrally-formed chain element comprising an elongated U-shaped side bar structure whose ends are formed into coaxial helically-wound pin-barrel sections, the axes of the barrel sections being substantially normal to the plane of the side bar structure.

15. An integrally-formed chain element having an elongated U-shaped side bar structure and two coaxial helically-wound pin-barrel sections respectively disposed upon opposite sides of the general plane of the U-shaped structure.

16. A chain comprising opposed U-shaped bar structures, and helically-wound pin-barrel sections connected to and intermediate the bar structures at both the U and open ends of the latter.

17. A chain link comprising two opposed U-shaped bar structures reversed end to end, and helically-wound pin-barrel sections connected to and intermediate both ends of the two bar structures.

18. A chain link comprising opposed U-shaped bar structures, helically-wound pin-barrel sections connected to and intermediate the bar structures at both the U and open ends of the latter, and a barrel section exteriorly of each bar structure, said exterior barrel sections being disposed at opposite ends of the link.

19. A chain link comprising spaced side bar structures, wound pin-barrel sections connected to and exteriorly of the open ends of the outer bar structures, and other wound barrel sections connected to and intermediate of each adjacent pair of bar structures, all of said barrel sections being coaxial.

20. A chain link comprising spaced elongated U-shaped connecting bar structures formed at the U-bends into connecting pin supports, wound pin-barrel sections connected to and exteriorly of the open ends of the outer bar structures, and other wound barrel sections connected to and intermediate of the open ends of each adjacent pair of bar structures, all of said barrel sections being coaxial.

21. An integrally-formed chain link comprising opposed U-shaped side bar structures, helically-wound pin-barrel sections connected to and exteriorly of the open ends of the respective side bar structures, and an intermediate wound barrel section connected to and intermediate the open ends of the side bar structures, all of said barrel sections being coaxial.

22. An integrally-formed chain link comprising opposed elongated offset U-shaped side bar structures each formed at the U-bend into a connecting pin support, helically-wound pin-barrel sections connected to and exteriorly of the open ends of the respective side bar structures, and an intermediate wound barrel section connected to and intermediate the open ends of the side bar structures, all of said barrel sections being coaxial.

23. A lace chain link comprising a multiplicity of wound coaxial and spaced pin-barrel sections at each end, the barrel sections at each end being adapted respectively to interlock with barrel sections at the other end of a similar link to form complete barrels, and bars connecting the barrel sections at one link end with the barrel sections at the other link end.

24. A lace chain link comprising a multiplicity of wound coaxial and spaced pin-barrel sections at each end, the barrel sections at one link end being offset from the barrel sections at the other link end, and bars connecting the barrel sections at one link end with the barrel sections at the other link end.

25. A lace chain link comprising a multiplicity of wound coaxial and spaced pin-barrel sections at each end, the barrel sections at one link end being offset lengthwise of the link from the barrel sections at the other link end, and side bars connecting each two adjacent barrel sections at one link end with a barrel section at the other link end.

26. In a method of forming a chain element, the steps which consist in bending stock into a continuous side bar having a plurality of relatively angularly-disposed portions, and coiling separate pin-barrel sections from the stock upon the two sides of the side plane of the bar.

27. An integrally-formed chain element comprising a pin-barrel formed of two coaxial wound sections and a side bar having a pin support and connected to said barrel at the adjacent ends of the wound sections.

28. An integrally-formed chain element comprising a pin-barrel formed of two coaxial wound sections, and a connecting bar of U-formation disposed intermediate the two wound sections and whose arms are intersected by a common plane transversely intersecting the barrel axis.

29. A chain comprising opposed continuous side bar structures each having a plurality of relatively angularly-disposed portions, and wound pin-barrel sections connected to and intermediate the bar structures at both ends of the latter.

30. An integrally-formed chain element comprising a side bar structure having an intermediate U-shaped pin support and extended arms whose ends are formed into coaxial pin-barrel sections helically wound away from each other.

31. An integrally-formed chain element comprising a pin-barrel formed of two coaxial wound sections, and a side bar of U-formation connecting the opposed inner faces of the two sections.

FERDINAND H. DALRYMPLE.

CERTIFICATE OF CORRECTION.

Patent No. 2,129,407. September 6, 1938.

FERDINAND H. DALRYMPLE.

It is hereby certified that error appears in the printed specification of the above numbered patent requiring correction as follows: Page 1, second column, line 4, before "6-6" insert the word line; line 24, for "princple" read principle; page 4, second column, lines 47, 47-48, 50 and 55, for the word "support" read bearing; page 7, second column, line 48, claim 26, for "side plane of the bar" read plane of the side bar; and that the said Letters Patent should be read with this correction therein that the same may conform to the record of the case in the Patent Office.

Signed and sealed this 1st day of November, A. D. 1938.

Henry Van Arsdale (Seal) Acting Commissioner of Patents.